Feb. 8, 1944.  A. SCHUSTERMAN  2,341,480
MULTICOLOR BOX CAMERA
Filed Aug. 25, 1941  2 Sheets-Sheet 1
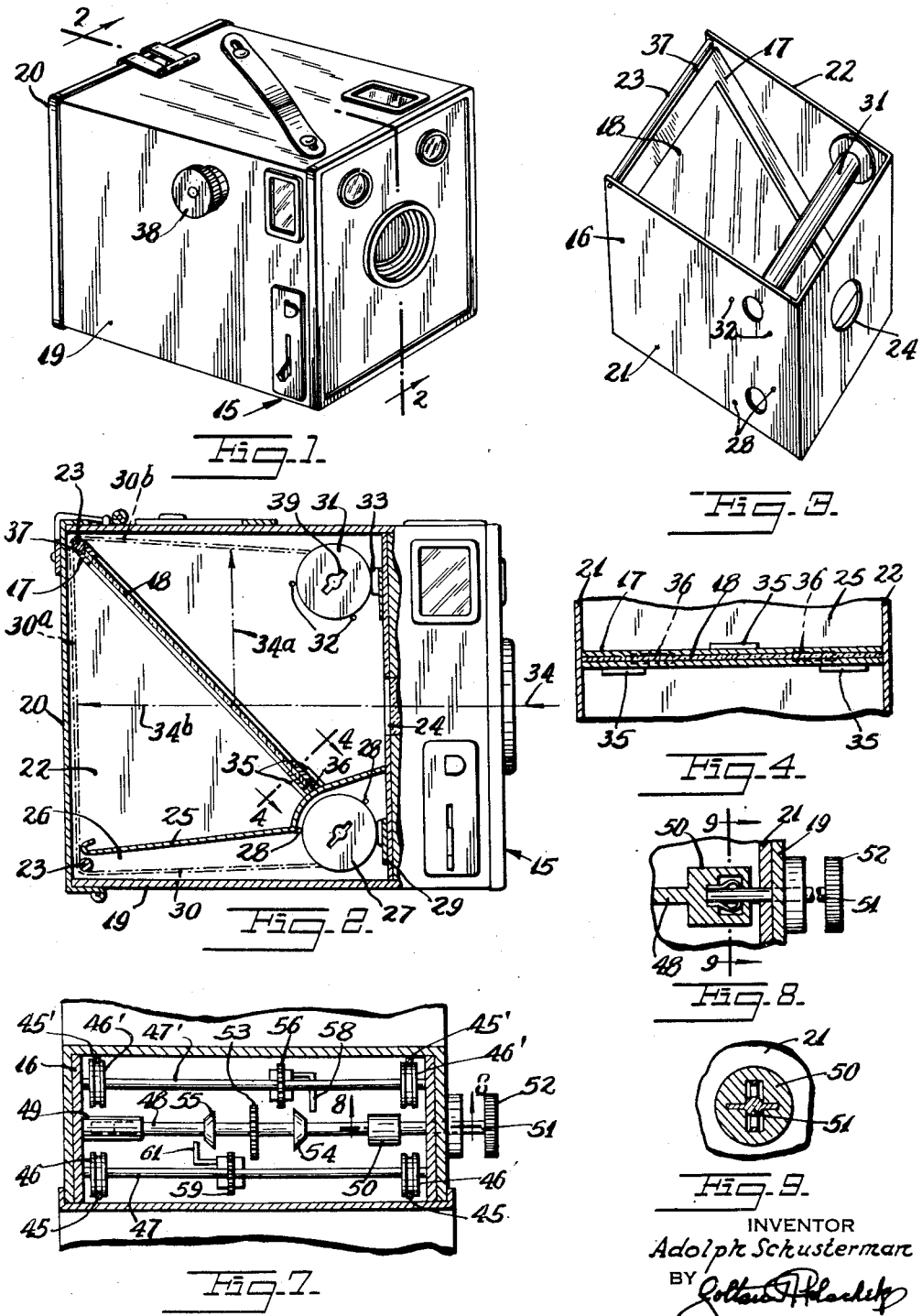
INVENTOR
*Adolph Schusterman*
BY
ATTORNEY Feb. 8, 1944.　　　A. SCHUSTERMAN　　　2,341,480
MULTICOLOR BOX CAMERA
Filed Aug. 25, 1941　　　2 Sheets-Sheet 2

INVENTOR
Adolph Schusterman
BY
ATTORNEY

Patented Feb. 8, 1944

2,341,480

UNITED STATES PATENT OFFICE 2,341,480

MULTICOLOR BOX CAMERA

Adolph Schusterman, New York, N. Y.

Application August 25, 1941, Serial No. 408,147

4 Claims. (Cl. 95—2)

This invention relates to new and useful improvements in cameras, and has more particular reference to the application of a Cellophane reflector filter to the camera for color photography.

The invention contemplates a construction which may be used in conjunction with box cameras as well as other types of cameras, and moving picture cameras.

Still further the invention proposes the provision of a frame with a Dupont non-washable red Cellophane reflector filter located at a 45° angle to reflect rays of light and to allow other rays to pass through.

Still further the invention contemplates a novel construction by which said frame is mounted within and held in position in the camera.

Another object of the invention resides in the association of certain shutters in the vicinity of the Cellophane reflector filter, by which certain rays may be shut out when desired.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

Fig. 1 is a perspective view of a box camera provided with a Cellophane reflector filter constructed in accordance with this invention.

Fig. 2 is a transverse vertical sectional view taken on the line 2—2 of Fig. 1.

Fig. 3 is a perspective view of the removable casing of the camera, removed and shown supporting the Cellophane reflector filter.

Fig. 4 is a transverse sectional view taken on the line 4—4 of Fig. 2.

Fig. 7 is a fragmentary enlarged sectional view taken on the line 7—7 of Fig. 6.

Fig. 8 is a fragmentary sectional view taken on the line 8—8 of Fig. 7.

Fig. 9 is a fragmentary sectional view taken on the line 9—9 of Fig. 8.

Figure 5:
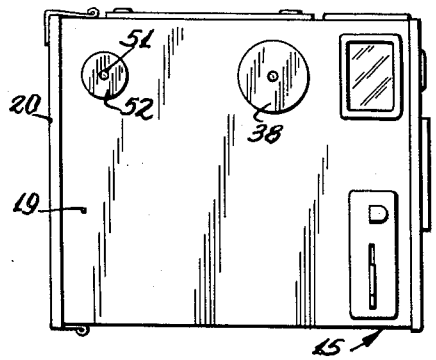
Fig. 5 is a side elevational view of a camera constructed in accordance with a modified form of this invention.

In Figs. 1 to 4, one form of the invention is disclosed in which a standard box camera 15 is shown provided with an improved removable casing 16 supporting a frame 17 with a Cellophane reflector filter 18, in accordance with this invention. The camera 15 includes the usual box shaped housing 19 having an openable back 20 through which the casing 16 may be engaged into position and removed from position when desired. The casing 16 includes a pair of side walls 21 and 22 held in relatively spaced positions with rods 23 mounted between these walls. With this construction the casing 16 is open at least at the top and at the back. At the front it is closed and provided with an aperture 24 through which the light from the lens and shutter mechanism may pass.

A partition wall 25 is mounted across the bottom portions of the side walls 21 and 22 and divides off a bottom compartment 26. Support means for a bottom supply spool of film 27 is located within the compartment 26. The spool 27 is turnably supported by several support pins 28 and a leaf spring 29 urging the spool against the pins 28. The dot and dash lines 30 schematically indicate the film coming off the supply spool 27. This film is shown extended across the rods 23, and connects with the top receiving spool 31. This top receiving spool 31 is turnably mounted within the casing 16. It is urged against support pins 32 by a leaf spring 33.

With the above construction a section 30ª of the film 30 extends across the back of the camera, and another section 30ᵇ extends across the top of the camera. The frame 17 is mounted diagonally across the casing 16 at an angle of 45° so that the light entering the camera, and schematically illustrated by the dot and dash lines 34, strikes the reflector filter 18. Some of this light is reflected upwards against the film section 30ᵇ, as indicated by the dot and dash lines 34ª. Some of the light passes through the reflector filter 18, as indicated by the line 34ᵇ, and strikes the film section 30ª.

It is proposed that the filter 18 be of Dupont non-washable red Cellophane. The upper film section 30ᵇ is printed and the print (positive) is dyed red. The back film section 30ª is printed on wash-off relief film and synchronized together with the red film. This prints blue on to the red film which is then ready for use, as a master positive for duplicate printing.

The frame 17 is releasably held in position. There are several side lugs 35 which are mounted on the partition 25 and which engage the front and back bottom edges of the frame 17. Leaf springs 36 also on the partition 25 urge the frame 17 upwards. The top of the frame 17 has a concave portion 37 which engages one of the rods 23. Thus the frame 17 is releasably held in position. It may be removed by manually forcing it downwards to compress the leaf springs 36 and then moving the top of the frame 17 laterally to disengage it from the rod 23. The frame is then free to be pulled out from the casing 16. The camera is provided with the usual depressible knob 38 which may be connected with the key opening 39 in the top spool 31 in the usual way so that the film may be wound thereon. In other respects the camera is standard.

In Figs. 5 to 11 another form of the invention has been disclosed which is very similar to the prior form, distinguishing merely in the fact that a pair of flexible shutters 40 and 41 have been provided, which may be individually engaged across the casing 16 of the camera to shield off the top and the back sections of the film, when this is desired. The shutter 40 is wound up and located within a hollow drum 42 mounted in the compartment 26. This drum has a slot 43 through which the shutter 40 extends. A track system 44 is mounted on the side walls of the casing 16 to guide the shutter 40 along the back of the camera. Cables 45 are connected with the sides of the shutter and are extended upwards over drums 46 mounted on a shaft 47 which is rotative in the top portion of the casing 16. The shutter 41 is also wound up and housed within a hollow tubular casing 42 having a slit 43 in one side through which it passes. Tracks 44' are mounted upon the side walls of the casing 16 to guide the shutter 41 across the top section of the film. Cables 45' are connected with the sides of the shutter and engage over drums 46' mounted on a shaft 47' mounted across the side wall of the casing 16.

Another shaft 48 is located between the shafts 47 and 47' and is turnably and slidably mounted. One end of the shaft 48 engages in a bearing 49 mounted on one wall of the casing 16. The other end of the shaft 48 is provided with a coupling 50 coactable with the stem 51 of a turning device having a turning knob 52. The shaft 48 is provided with a gear 53 and frusto-conical wheels 54 and 55 mounted on opposite sides of the gear 53. The shaft 47' is provided with a gear 56 which is adapted to mesh with the gear 53 and which is normally held from turning by a spring operated pawl 57. This pawl has a control finger 58 which is located in the vicinity of the conical shaped wheel 54.

The shaft 47 is also provided with a gear 59 which is held from turning by a spring pressed pawl 60. The pawl 60 is provided with a finger 61 disposed in the path of motion of the conical shaped wheel 55. Each shutter 40, 41 is mounted and wound on a shaft 63 which is connected with a spring 64 mounted between the shaft and the casing of the shutter, and acting normally to retract the shutter.

The knob 52 may be pressed inwards to connect the coupling 50, 51. Then the shaft 48 may be shifted inwards or outwards to engage the gear 53 with the gear 59 or with the gear 56. When these gears are engaged the conical shaped wheels 55 or 54 engage and move the fingers 61 or 58 to release the gear 59 or 56. Then the knob 52 may be turned to wind up the cables 45 or 45' to extend the shutters 40 or 41, or to let out the shutters so that the springs 64 rewind the shutters.

The construction is such that the shutter 40 may be extended across the back of the casing to block off the back section of the film, or the shutter 41 may be extended across the top of the casing to block off the top section of the film, or both shutters may be extended to block off both sections of the film. In other respects this form of the invention is similar to the previous form.

In this form of the invention a filter 65 is shown to be attached in front of the lens 66. This filter consists of a holder 67 and a filter sheet 68 made of Cellophane or like material, in any desired color. When this filter 68 is made of a colorless transparent Cellophane sheet, it will produce a partially polarized effect.

Figure 12:
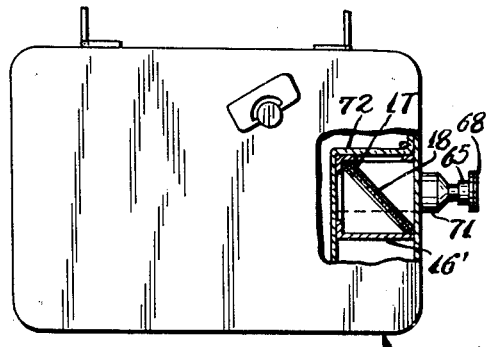
Fig. 12 is an elevational view of a moving picture camera constructed in accordance with this invention, and illustrated with a portion thereof broken away to disclose interior parts.
Figure 6:
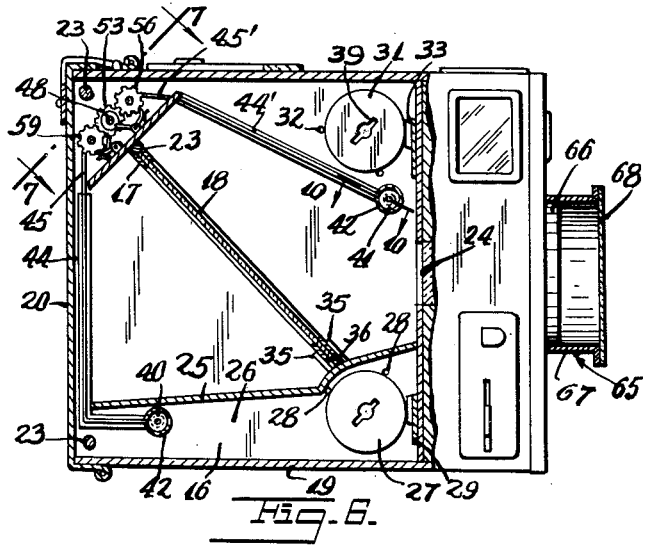
Fig. 6 is a vertical sectional view of the camera shown in Fig. 5.
Figure 10:
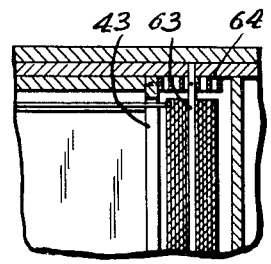
Fig. 10 is a fragmentary sectional view taken on the line 10—10 of Fig. 6.
Figure 11:
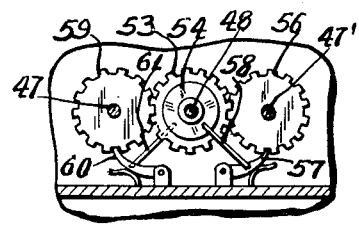
Fig. 11 is a fragmentary enlarged detailed view of a portion of Fig. 6.

In Fig. 12 another form is disclosed in which a standard motion picture machine 70 is shown provided with a removable casing 16' mounted directly behind the shutter and lens 71 of the camera. This casing 16' supports the frame 17 having the Cellophane reflector filter 18. The film 72 of the camera is guided over the top and the back of the casing 16'. With this construction two sections of the film are exposed, due to direct rays through the filter reflector 18, and the other for the reflected rays. The camera 70 is standard in all respects except that the ratio of the sprockets must be changed so that the film 17 advances two frames at a time to prevent double exposure to the top and back sections of the film. The upper film section is printed (positive) and dyed red. The back section is printed on wash-off relief film and synchronized together with the red film. This prints blue on to the red film which is then ready for use as a master positive for duplicate printing.

Figure 13:
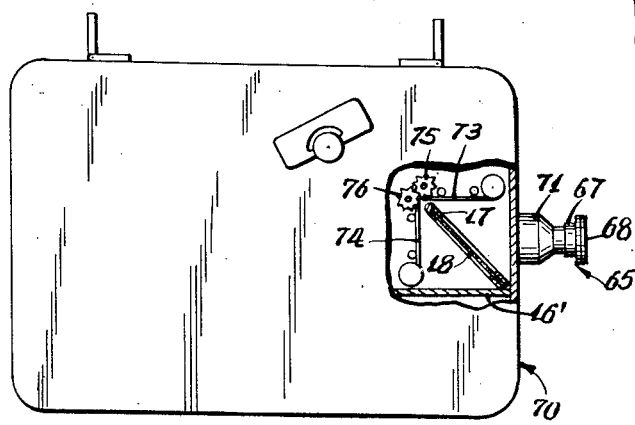
Fig. 13 is a similar view to Fig. 12 but illustrating a further application of the invention.

In Fig. 13 two separate films 73 and 74 are illustrated to be synchronously connected by the gear 75 and 76, respectively, so that film 74 may be exposed to the direct rays through the filter 18, while film 73 is exposed to the reflected rays.

It is to be understood that the above principle may be used in connection with two or more color box cameras, of any design.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A box camera, comprising a box shaped housing having an open back closed by means of an openable back wall, a casing removably mounted within said housing and having side walls held in a relatively spaced position with rods and being opened at the top and back, a partition wall extending across the bottom portion of said casing, means beneath said partition wall and on the side walls of said casing for supporting a bottom spool for film, means at the top front portion of the side walls of said casing for supporting a top spool for film, and a reflecting-transparent filter supported between the side walls of said casing at a 45° angle extending upwards from the front to the rear, whereby said back wall may be opened permitting said casing, film and filter to be removed as a unit from the open back of said housing, a top shutter for extending beneath the top section of film, a back shutter for extending to the front of a back section of film, each of said shutters, comprising a hollow drum containing an extendable flexible shutter, a rotative shaft, spaced drums on said shaft, cables extending from the corners of said flexible shutter and connected to said drums to be wound thereon to extend said flexible shutter when said shaft is turned, and means for selectively rotating the shaft of either of said shutters to wind said cables on said drums and extend said flexible shutters.

2. A box camera, comprising a box shaped housing having an open back closed by means of an openable back wall, a casing removably mounted within said housing and having side walls held in a relatively spaced position with rods and being opened at the top and back, a partition wall extending across the bottom portion of said casing, means beneath said partition wall and on the side walls of said casing for supporting a bottom spool for film, means at the top front portion of the side walls of said casing for supporting a top spool for film, and a reflecting-transparent filter supported between the side walls of said casing at a 45° angle extending upwards from the front to the rear, whereby said back wall may be opened permitting said casing, film and filter to be removed as a unit from the open back of said housing, a top shutter for extending beneath the top section of film, a back shutter for extending to the front of a back section of film, each of said shutters, comprising a hollow drum containing an extendable flexible shutter, a rotative shaft, spaced drums on said shaft, cables extending from the corners of said flexible shutter and connected to said drums to be wound thereon to extend said flexible shutter when said shaft is turned, and means for selectively rotating the shaft of either of said shutters to wind said cables on said drums and extend said flexible shutters, comprising a shaft rotatively and slidably supported between the shafts of said shutters and provided with an exterior turning knob, a gear mounted on the shaft of each of said shutters and said gears being laterally spaced, and a gear on said rotative and slidably mounted shaft and having a normal position between said gears and selectively engageable with either of said gears in shifted positions of said slidable shaft to selectively rotate either of the shafts of said shutters as said latter shaft is turned.

3. A box camera, comprising a box shaped housing having an open back closed by means of an openable back wall, a casing removably mounted within said housing and having side walls held in a relatively spaced position with rods and being opened at the top and back, a partition wall extending across the bottom portion of said casing, means beneath said partition wall and on the side walls of casing for supporting a bottom spool for film, means at the top front portion of the side walls of said casing for supporting a top spool for film, and a reflecting-transparent filter supported between the side walls of said casing at a 45° angle extending upwards from the front to the rear, whereby said back wall may be opened permitting said casing, film and filter to be removed as a unit from the open back of said housing, a top shutter for extending beneath the top section of film, a back shutter for extending to the front of a back section of film, each of said shutters, comprising a hollow drum containing an extendable flexible shutter, a rotative shaft, spaced drums on said shaft, cables extending from the corners of said flexible shutter and connected to said drums to be wound thereon to extend said flexible shutter when said shaft is turned, and means for selectively rotating the shaft of either of said shutters to wind said cables on said drums and extend said flexible shutters, and resilient means urging said hollow drums to retain said flexible shutters therein, and means locking said shafts of said shutters against rotating in the extended position of said flexible shutters to retain said flexible shutters extended against the action of said resilient means.

4. A box camera, comprising a box shaped housing having an open back closed by means of an openable back wall, a casing removably mounted within said housing and having side walls held in a relatively spaced position with rods and being opened at the top and back, a partition wall extending across the bottom portion of said casing, means beneath said partition wall and on the side walls of said casing for supporting a bottom spool for film, means at the top front portion of the side walls of said casing for supporting a top spool for film, and a reflecting-transparent filter supported between the side walls of said casing at a 45° angle extending upwards from the front to the rear, whereby said back wall may be opened permitting said casing, film and filter to be removed as a unit from the open back of said housing, a top shutter for extending beneath the top section of film, a back shutter for extending to the front of a back section of film, each of said shutters, comprising a hollow drum containing an extendable flexible shutter, a rotative shaft, spaced drums on said shaft, cables extending from the corners of said flexible shutter and connected to said drums to be wound thereon to extend said flexible shutter when shaft is turned, and means for selectively rotating the shaft of either of said shutters to wind said cables on said drums and extend said flexible shutters, and resilient means urging said hollow drums to retain said flexible shutters therein, and means locking said shafts of said shutters against rotating in the extended position of said flexible shutters to retain said flexible shutters extended against the action of said resilient means, and means for freeing said locking means when either of said shafts is to be rotated to extend its respective flexible shutter.

ADOLPH SCHUSTERMAN.